(12) United States Patent
Wong

(10) Patent No.: US 11,627,469 B2
(45) Date of Patent: Apr. 11, 2023

(54) SECURE PAIRING OF DEVICES

(71) Applicant: MOTOROLA SOLUTIONS, INC., Chicago, IL (US)

(72) Inventor: Jack Wong, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 93 days.

(21) Appl. No.: 16/935,735

(22) Filed: Jul. 22, 2020

(65) Prior Publication Data
US 2022/0030420 A1    Jan. 27, 2022

(51) Int. Cl.
*H04W 12/50*      (2021.01)
*H04W 12/0431*    (2021.01)
*H04W 12/06*      (2021.01)

(52) U.S. Cl.
CPC ....... *H04W 12/50* (2021.01); *H04W 12/0431* (2021.01); *H04W 12/06* (2013.01)

(58) Field of Classification Search
CPC ..... H04W 12/50; H04W 12/55; H04W 12/69; H04W 12/06; H04W 12/0431
See application file for complete search history.

(56) References Cited

U.S. PATENT DOCUMENTS

| 8,254,571 | B1 * | 8/2012 | Boyen | .................. | H04L 9/0869 |
| | | | | | 713/168 |
| 9,949,065 | B1 | 4/2018 | Zarakas et al. | | |
| 2008/0057890 | A1 | 3/2008 | McKillop et al. | | |
| 2011/0252243 | A1 * | 10/2011 | Brouwer | ................. | G06F 21/62 |
| | | | | | 713/189 |
| 2012/0083209 | A1 | 4/2012 | Giles et al. | | |
| 2013/0099892 | A1 * | 4/2013 | Tucker | .................... | B60R 25/01 |
| | | | | | 340/5.61 |

(Continued)

FOREIGN PATENT DOCUMENTS

WO    2016168409 A1    10/2016

OTHER PUBLICATIONS

The International Search Report and the Written Opinion, corresponding patent application No. PCT/US2021/038584 filed: Jun. 23, 2021, dated Oct. 7, 2021, all pages.

*Primary Examiner* — Fatoumata Traore
*Assistant Examiner* — Hamid Talaminaei
(74) *Attorney, Agent, or Firm* — Ragurman Kumaresan

(57) ABSTRACT

A process for securely pairing devices. A host device receives an input indicating a user credential for logging into the host device and initiates a scanning process for discovering target devices available for pairing with the host device. During the scanning process, the host device receives wireless pairing information from a target device. The wireless pairing information includes a unique device identifier associated with the target device and an electronic signature generated as a function of a signature key stored at the target device and the unique device identifier. The host device compares the electronic signature with a run-time signature generated at the host device as a function of the user credential received at the host device and the unique device identifier. The host device then initiates a pairing process to establish a short-range communication link with the target device when the electronic signature matches with the run-time signature.

17 Claims, 6 Drawing Sheets

(56) References Cited

U.S. PATENT DOCUMENTS

| | | | |
|---|---|---|---|
| 2013/0166920 A1* | 6/2013 | Cousins | G06F 12/1408 |
| | | | 713/189 |
| 2013/0174252 A1* | 7/2013 | Weber | H04W 12/50 |
| | | | 726/20 |
| 2016/0044719 A1* | 2/2016 | Sidhu | H04L 67/141 |
| | | | 370/329 |
| 2017/0180971 A1* | 6/2017 | Schuler | H04W 76/14 |
| 2020/0019255 A1 | 1/2020 | Gilbert et al. | |
| 2020/0077259 A1 | 3/2020 | Sachs | |
| 2021/0258308 A1* | 8/2021 | Avetisov | H04L 9/3234 |

* cited by examiner

US 11,627,469 B2

SECURE PAIRING OF DEVICES

BACKGROUND

Pairing is a process that helps set up an initial communication linkage between two or more wireless devices. Once the initial communication linkage is set up, devices are successfully connected to allow communications between them. One example scenario where pairing devices is desired is in the area of public safety. Public safety officers often select radios from a pool of available mobile radios and pair their wireless accessory devices with the selected mobile radio. When the pairing is being performed, numerous other devices that implement pairing technology (e.g., Bluetooth) may be present in the surrounding area of the public safety officers. So, public safety officers may have difficulty determining which devices are to be paired. Also, multiple officers in proximity to each other may be attempting to pair their accessories with respectively selected mobile radios at the same time. This may result in officers selecting and pairing their radios with accessories of other officers. Moreover, for security reasons, officer's radios are programmed to clear information about the paired devices when the radios are returned to the multi-unit charger after the work-shift. So, officers need to perform a pairing procedure with their wireless accessory devices each time they select a radio. While some of these concerns may be addressed using out-of-band (OOB) pairing technologies, implementing an OOB pairing technologies such as near-field communications for this purpose may increase the cost of the radio. Thus, known pairing technologies and processes have shortcomings in providing quick and easy pairing between a mobile radio selected from a pool of mobile radios and desired multiple wireless accessory devices.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
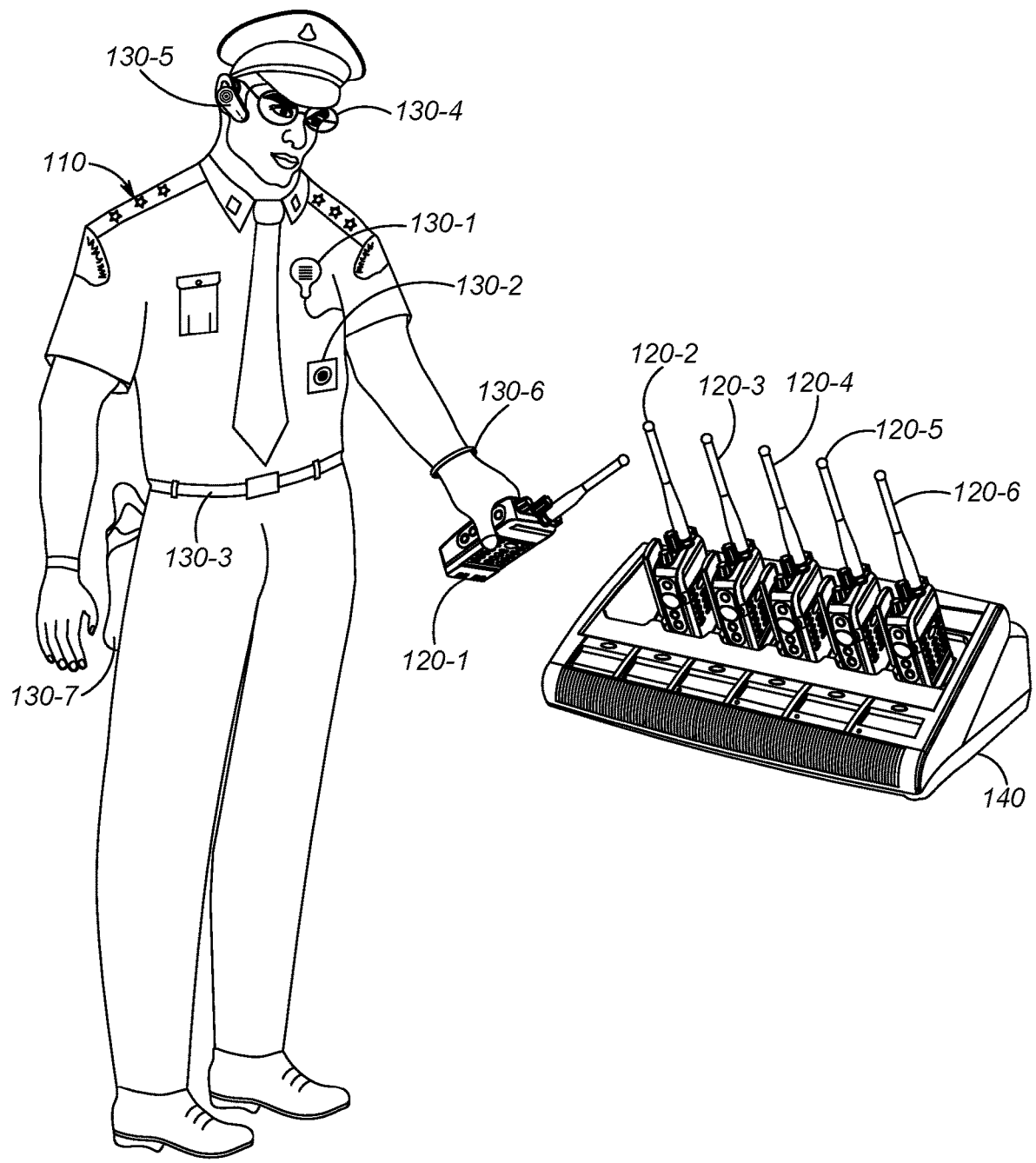
FIG. 1 is a system diagram illustrating a system including host and target devices associated with a user in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

One embodiment provides a method of securely pairing devices. The method comprises: receiving, at a host device, an input indicating a user credential for logging into the host device; initiating, at the host device, a scanning process for discovering target devices available for pairing with the host device; receiving, at the host device, during the scanning process, wireless pairing information from a target device of the target devices, the wireless pairing information including (i) a unique device identifier associated with the target device and (ii) an electronic signature generated as a function of a signature key stored at the target device and the unique device identifier associated with the target device; comparing, at the host device, the electronic signature with a run-time signature generated at the host device as a function of the user credential received at the host device and the unique device identifier included in the wireless pairing information; and initiating, at the host device, a pairing process to establish a short-range communication link with the target device when the electronic signature matches with the run-time signature.

Another embodiment provides a host device. The host device includes a short-range wireless radio and an electronic processor communicatively coupled to the short-range wireless radio. The electronic processor is configured to: receive an input indicating a user credential for logging into the host device; initiate, via the short-range wireless radio, a scanning process for discovering target devices available for pairing with the host device; receive, via the short-range wireless radio, during the scanning process, wireless pairing information from a target device of the target devices, the wireless pairing information including (i) a unique device identifier associated with the target device and (ii) an electronic signature generated as a function of a signature key stored at the target device and the unique device identifier associated with the target device; compare the electronic signature with a run-time signature generated at the host device as a function of the user credential received at the host device and the unique device identifier included in the wireless pairing information; and initiating, via the short-range wireless radio, a pairing process to establish a short-range communication link with the target device when the electronic signature matches with the run-time signature.

Another embodiment provides a method of securely pairing devices. The method comprises: receiving, at a host device, an input indicating a user credential for logging into the host device; initiating, at the host device, a scanning process for discovering target devices available for pairing with the host device; receiving, at the host device, during the scanning process, wireless pairing information from a target device of the target devices, the wireless pairing information including an electronic signature generated as a function of a signature key stored at the target device and the unique device identifier associated with the target device; comparing, at the host device, the electronic signature with a run-time signature generated at the host device as a function of the user credential received at the host device; and initiating, at the host device, a pairing process to establish a short-range communication link with the target device when the electronic signature matches with the run-time signature.

Each of the above-mentioned embodiments will be discussed in more detail below, starting with example system and device architectures of the system in which the embodiments may be practiced, followed by an illustration of processing blocks for achieving an improved technical method for securely pairing devices. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system diagram illustrates a system 100 of wireless devices that a user 110, for example, an officer or other person, carry or wear, including a host device 120 and one or more target devices 130. The host device 120 includes a wireless radio communication device, for example, a mobile radio used for narrowband and/or broadband communications. In one embodiment, the host device 120 represents a device 120-1 selected by the user 110 from a pool of host devices 120-1, 120-2, 120-3 etc., placed in a multi-unit charger 140 for charging. For example, some agencies (e.g., public safety agencies) require their users 110 (e.g., firemen and police officers) to take an available device 120 from the multi-unit charger 140 (or a dedicated radio-shelf) at the start of their work-shift and then return the device 120 to the multi-unit charger 140 (or a dedicated radio-shelf) at the end of their work-shift. In such cases, it is possible that the users 110 may not select and operate the same host device 120 during each work-shift. Accordingly, in some embodiments, the host device 120 is programmed to clear any information about the target devices paired to the host device after every power cycle or work-shift. So, when the user 110 selects a host device 120 from the pool of host devices 120 placed in the multi-unit charger 140, the host device 120 does not contain any information about the target devices 130 previously paired with the host devices 120. On the other hand, agencies may allow the target devices 130 to remain assigned to the same user 110 for multiple work-shifts. So, the user 110 may use the same set of target devices 130 for multiple work-shifts. The target devices 130 may include electronic accessories that need to be paired and connected to a host device 120 selected by the user 110. As shown in FIG. 1, the target devices 130 may include a remote speaker microphone (RSM) 130-1, a video camera 130-2, a biometric sensor device 130-3, a smart glass 130-4, an earpiece 130-5, an activity tracker 130-6, a weapon status detector 130-7, and the like. Embodiments of the present disclosure ensure that the user 110 can quickly and securely pair one or more of the target devices 130 assigned to the user 110 with a host device 120 (e.g., host device 120-1) selected by the user 110 from a pool of host devices 120 placed in the multi-unit charger 140.

The host device 120 may be any wireless device used for infrastructure-supported or direct mode media (e.g., voice, audio, video, etc.) communication via a long-range transmitter (e.g., in comparison to a short-range transmitter such as a Bluetooth, IEEE 802.11 Wi-Fi, Zigbee, IrDA, or NFC transmitter) and/or transceiver with other communication devices or infrastructure devices. The long-range transmitter may have a transmit range on the order of miles, e.g., 0.5-50 miles, or 1-10 miles (or a similar range in meters).

Infrastructure-supported long-range wireless communications may be made via radio access networks (RANs) that provide for radio communication links to be arranged within the network between a plurality of host devices 120. Such host devices 120 may also be known as 'mobile stations' or 'subscriber devices.' At least one other terminal, e.g. used in conjunction with host devices 120, may be a fixed terminal, e.g. a base station, eNodeB, repeater, and/or access point. Such a RAN typically includes a system infrastructure which generally includes a network of various fixed terminals that are in direct radio communication with the host devices. Each of the fixed terminals operating in the RAN may have one or more transceivers that may, for example, serve host devices 120 in a given region or area, known as a 'cell' or 'site', by radio frequency (RF) communication. The host devices 120 that are in direct communication with a particular fixed terminal are said to be served by the fixed terminal. In one example, all radio communications to and from each host device 120 within the RAN are made via respective serving fixed terminals. Sites of neighboring fixed terminals may be offset from one another and may be non-overlapping or partially or fully overlapping with one another.

RANs may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. RANs may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities. Because the LMR systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Host devices 120 in RANs such as those set forth above send and receive media streams (encoded portions of voice, audio, and/or audio/video streams) in a call in accordance with the designated protocol.

Individual (e.g., one to one) or group (e.g., one to many) calls may be made between wireless and/or wireline participants in accordance with the narrowband or broadband protocol or standard. Group members for group calls may be statically or dynamically defined. That is, in a first example, a user or administrator working on behalf of the user may indicate to the switching and/or radio network (perhaps at a controller device, such as a call controller, PTT server, serving gateway, radio network controller (RNC), zone controller, or mobile management entity (MME), base station controller (BSC), mobile switching center (MSC), site controller, Push-to-Talk controller, or other network device) a list of participants of a group at the time of the call or in advance of the call. The group members (e.g., wireless radio communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, host devices 120 may dynamically affiliate with a group (and also disassociate with the group) perhaps based on user input, and the switching and/or radio network may track group membership and route new group calls according to the current group membership.

Although in the example of FIG. 1 a host device 120 including a long-range transmitter is used as an example device, in other embodiments, other types of host devices 120 may be used, with or without a long-range transmitter, including but not limited to, a tablet computer, a laptop computer, and a mobile phone device that provides individual or group-communication services over a short-range wireless communications link, such as but not limited to Bluetooth.

In the example of FIG. 1, the host device 120 forms the hub of communication connectivity for the user 110, through which other target devices 130 (e.g., wireless accessory devices) may communicate. In order to communicate with such other target devices 130, the host device 120 also contains a short-range transmitter (e.g., in comparison to the long-range transmitter such as a LMR or Broadband transmitter or in addition to another short-range transmitter) and/or transceiver. The short-range transmitter may be a Bluetooth/low energy transmitter having a transmit range less than 10 meters.

Target devices 130 communicate with the host device 120 via their own short-range transmitter and/or transceivers, and provide specialized function extensions to the host device 120. For example, a target device 130 such as the RSM 130-1 may act as a remote microphone that the user 110 may access more easily and is better positioned near the user's 110 mouth. Audio and/or voice received at the RSM 130-1 may be provided to the host device 120 for further transmission via its long-range transmitter or secondary short-range transmitter to other users. A speaker may also be provided in the RSM 130-1 unit such that audio and/or voice received at the host device 120 is transmitted to the RSM 130-1 and reproduced closer to the user's 110 ear.

Target devices 130 may include a video camera 130-2 that could be an always-on device or an activated-on-demand video capture device that provides video and/or audio to the host device 120 for storage at the host device 120 or for further transmission to a dispatch center or to other host device users via the host device's 120 long-range-transmitter.

Target devices 130 may include a biometric sensor device 130-3 capable of sensing biometric data of its wearer, such as heart rate, body temperature, etc. Additionally, or alternatively, an environmental sensor may be provided to detect environmental parameters such as oxygen levels, temperature, radiation, etc. The biometric sensor device 130-3 provides measured parameter information to the host device 120 for storage and/or analysis at the host device 120 and/or for further transmission to a dispatch center or to other users via the host device's 120 long-range-transmitter.

Target devices 130 may include smart glasses 130-4 that maintain a bi-directional connection with the host device 120 and provide an always-on or on-demand video feed pointed in a direction of the officer's gaze, and/or may provide a personal display via a projection mechanism integrated into the smart glasses 130-4 for displaying information such as text, images, or video received from the host device 120. In some embodiments, an additional user interface mechanism such as a touch interface may be provided on the smart glasses 130-4 that allows the user 110 to interact with the display elements displayed on the smart glasses 130-4.

Target devices 130 may include an earpiece 130-5 that maintains an audio connection with the host device 120 and provide the user 110 the ability to hear private or group communications received at the host device 120 from other host devices or from an infrastructure device, and which may be provided to the earpiece for private reproduction to the user 110.

Target devices 130 may further include an activity tracking device 130-6 for tracking an activity of the user 110, and may include one or more movement sensors (such as an accelerometer, magnetometer, and/or gyroscope) that may periodically or intermittently provide to the host device 104 indications of orientation, direction, steps, acceleration, and/or speed, perhaps accompanying other information. An accelerometer is a device that measures acceleration. Single and multi-axis models are available to detect magnitude and direction of the acceleration as a vector quantity, and can be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and can be used to determine a direction in which a person or device is facing. Other types of movement sensors could additionally, or alternatively, be used as well. Although the mobility tracker is shown in FIG. 1 as a bracelet worn around the wrist, in other examples, the mobility tracker may be worn around another part of the body, or may take a different physical form including an earring, a finger ring, a necklace, or some other type of wearable form factor.

Target devices 130 may also include a weapon status sensor 130-7 that maintains state information regarding a weapon normally holstered within the user's 110 weapon holster. The weapon status sensor may detect a change in state (presence to absence) and/or an action (removal) relative to a weapon normally holstered within the holster to which the sensor is coupled. The detected change in state and/or action may be reported to the host device 104 via its short-range transceiver. In some embodiments, the weapon status sensor may also detect whether the first responder's hand is resting on the weapon even if it has not yet been removed from the holster and provide such information to host device 120. Other possibilities exist as well.

Figure 2:
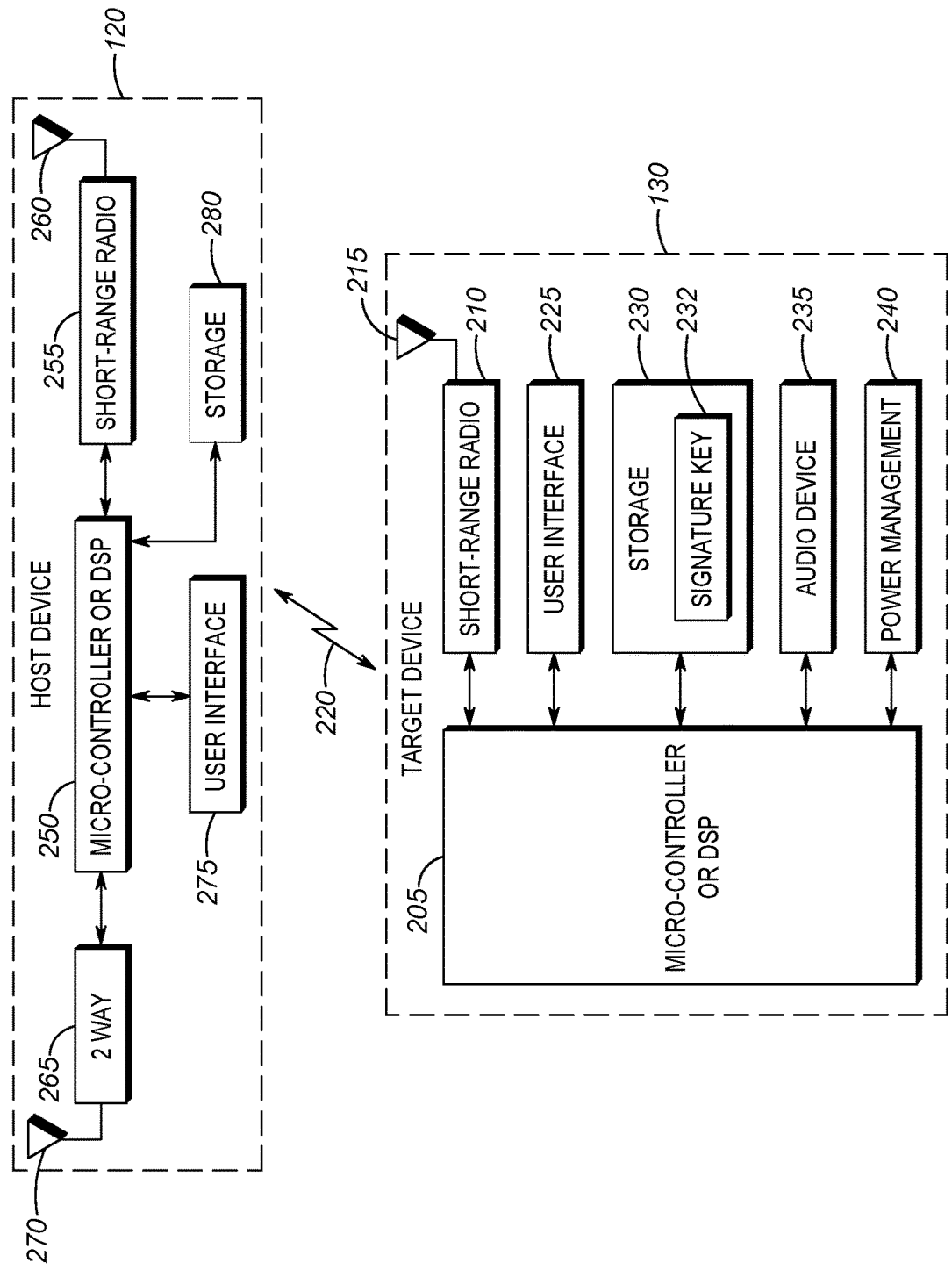
FIG. 2 is a pictorial diagram showing device structures and wireless interfaces between a host device and a target device in accordance with some embodiments.

FIG. 2 provides a more detailed block diagram of several of the major components of the system 100, including the host device 120 (e.g., host device 120-1) and a target device (e.g., the RSM 130-1 of FIG. 1) 130. While only one target device 130 is illustrated in FIG. 2 for ease of illustration, other embodiments may include more two or more target devices 130 having same or similar structures to that illustrated in FIG. 2.

The target device 130 comprises: a microcontroller or digital signal processor (DSP) 205; a short-range wireless radio 210 with a corresponding antenna 215 for communicating with host device 120 via a short-range communication link 220 (which may include a Bluetooth radio 210 and Bluetooth link 220, among other possibilities); a user interface 225 (which may include a display and/or LEDs, a touch input interface, a mechanical input interface, and/or one or more buttons or switches, among other possibilities); a computer readable storage 230 (which may store computer readable instructions that, when executed by the microcontroller 205, perform one or more of the transmitting, receiving, and/or processing steps set forth in FIGS. 3-6, and may further store a signature key 232 that was obtained from a host device 120 during a signing process when a user 110 has signed the target device 130 with a user credential assigned to the user); audio devices 235 (which may include a speaker for providing output audio to a user and a microphone for capturing user input and providing it to the host device 120); and power management circuit 240 (which monitors a battery and/or AC/DC wired input power connection and provides power status information to microcontroller 205). Additional electronic circuits may be added providing additional feature sets as well.

Host device 120 comprises: a microcontroller or DSP 250 (also referred to as an electronic processor); a short-range wireless radio 255 with a corresponding antenna 260 for communicating with other devices via a short-range communication link 220 (which may include a Bluetooth radio 255 and Bluetooth links 220, among other possibilities); a two-way narrowband (NB) or broadband (BB) radio 265 and corresponding antenna 270; a user interface 275 (which may include a display and/or LEDs, a touch input interface, a mechanical input interface, and/or one or more buttons or switches, among other possibilities, and that enables a user 110 to supply a user credential for logging into the host device 120 and to further select one or more target devices 130 for pairing and/or for signing the target device 130 with a user credential assigned to the user 110); and a computer readable storage 280 (which may store computer readable instructions that, when executed by the microcontroller 250, perform one or more of the transmitting, receiving, and/or processing steps set forth in FIGS. 3-6).

The two-way NB or BB radio 265 may operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. The two-way NB or BB radio 265 may additionally or alternatively operate according to an industry standard broadband protocol such as, for example, the Long Term Evolution (LTE) protocol including multimedia broadcast multicast services (MBMS), the open mobile alliance (OMA) push to talk (PTT) over cellular (OMA-PoC) standard, the voice over IP (VoIP) standard, or the PTT over IP (PoIP) standard, among many other possibilities.

Figure 3:
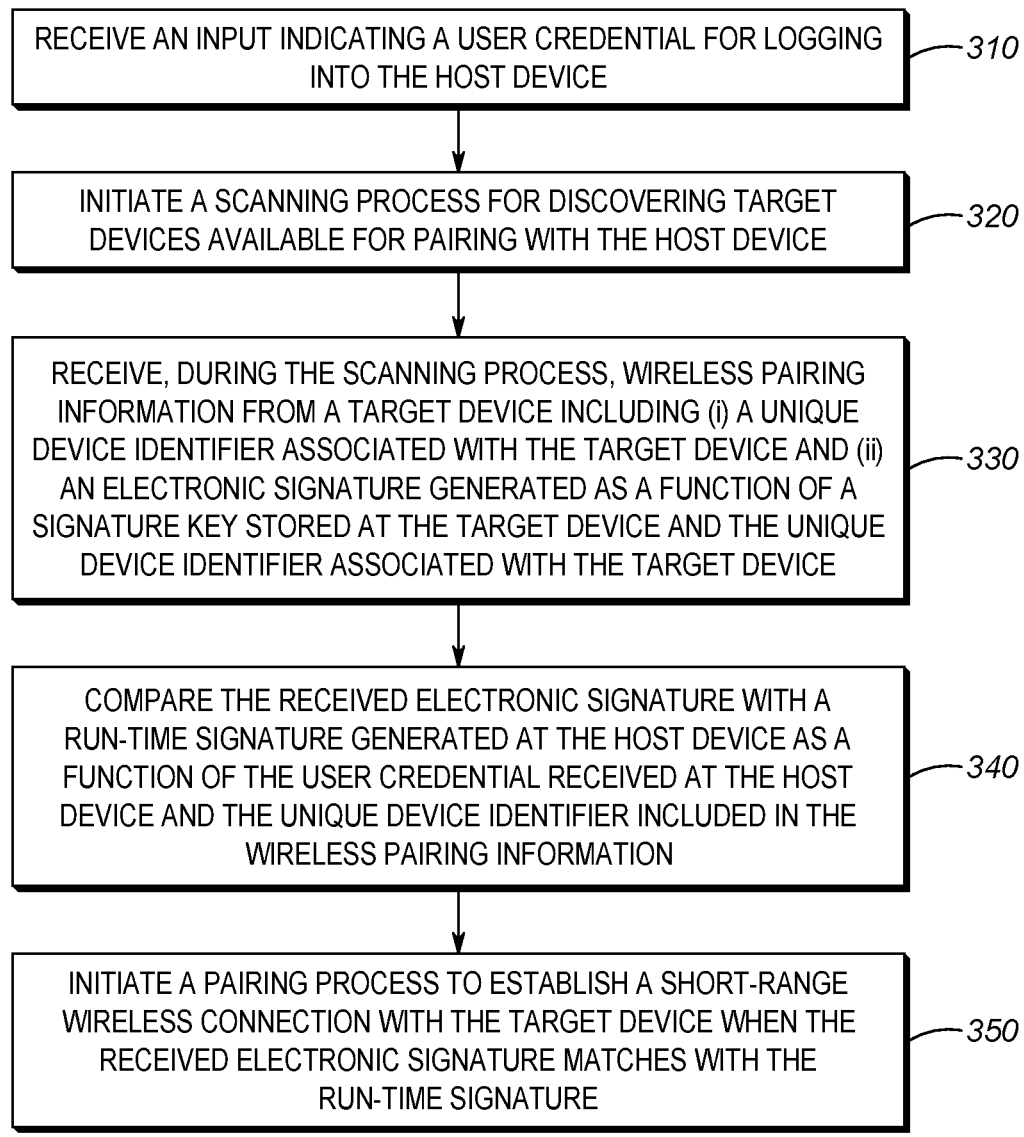
FIG. 3 is a flowchart illustrating a method of securely pairing devices in accordance with some embodiments.

Turning now to FIG. 3, a flowchart diagram illustrates a method 300 of securely pairing a host device 120 and one or more target devices 130 shown in FIG. 1. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. The host device 120 shown in FIG. 1 or 2 may execute method 300 via a micro-controller or DSP 250 implemented at the host device 120. The host device 120 may execute the method 300 at power-on, at some predetermined periodic time period thereafter, in response to a trigger raised locally at the device via an internal process or via a user interface 225, among other possibilities.

The method 300 of FIG. 3 need not be performed in the exact sequence as shown and likewise various blocks may be performed in different order or alternatively in parallel rather than in sequence. The method 300 may be implemented on variations of the system 100 of FIG. 1 as well.

Process begins at block 310 when the host device 120 receives an input indicating a user credential for logging into the host device 120. In accordance with some embodiments, the host device 120 represents a device selected by a user 110 from a pool of host devices (e.g., radios placed in a multi-unit charger 140) that are available for selection by the user 110, for example, at the beginning of a work-shift. A user 110 may select a host device 120 and further log into the host device by supplying a user credential assigned to the user 110. The user 110 may enter, via the user interface 275 of the host device 120, an input such as a username and/or a password indicating the user credential assigned to the user 110. Alternatively, the user credential may be provided to the host device 120 in the form of a biometric input including one or more of a fingerprint identification or a face identification. Other forms of user credentials are applicable as well. In response to receiving the user credential, the host device 120 authorizes the operation of the host device 120 by the user 110 after verifying that the user credential is associated with an authorized user.

Next, at block 320, the host device 120 initiates a scanning process for discovering target devices 130 available for pairing with the host device 120. The host device 120 may initiate a scanning process only when the user credential received at block 310 indicates that the user 110 is an authorized user. In one embodiment, the host device initiates the scanning process in response to receiving, via the user interface 275, a selection input from the user 110. The host device 120 may prompt the user 110 to provide the user credential each time the user 110 interacts with the user interface 275 to initiate the scanning process. In one embodiment, upon verifying that the user credential is associated with an authorized user, the host device 120 automatically initiates a scanning process perhaps further based on a detected context such as detecting a location within a "setup" room of a police station or in response to detecting discovery information over-the-air from one or more, or a threshold number (such as greater than four devices) of target devices 130.

In any event, at block 320, the host device 120 initiates a scanning process in which it searches for target devices 130 to connect with using a short-range receiver (e.g., Bluetooth radio 255) over a short-range communication link (e.g., Bluetooth link 220). The particular steps involved in initiating the scanning process will vary depending on the short-range protocol implemented between the host device 120 and the target device 130. For example, when the host device 120 and target devices 130 implement the Bluetooth short-range wireless protocol, the host device 120 may transmit an inquiry message and in response to this inquiry message, Bluetooth devices in a general discoverable or limited discoverable mode may respond. Other short-range wireless protocols may operate in same or similar fashions to the Bluetooth protocol.

At block 330, and perhaps in response to transmitting an inquiry message (when implementing the Bluetooth protocol) or perhaps on a periodic basis, the host device 120 receives, during the scanning process, from a target device 130, wireless pairing information generated by the target device 130. For example, in the case of the Bluetooth protocol, wireless pairing information generated by the target device 130 may include one or more of a Bluetooth hardware address (also referred to as a unique device identifier), a Bluetooth device name, clock information, a Bluetooth class, Bluetooth profile information, and any additional extended inquiry response (EIR) information of the target devices 130 among other possible information and signaling. Other possibilities exist for other short-range protocols as well.

In accordance with embodiments, regardless of which short-range protocol is implemented between the host device 120 and target device 130, the wireless pairing information received from the target device 130 may in addition include an electronic signature. The presence of the electronic signature in the wireless pairing information provides an indication to the host device 120 that the target device 130 sending the wireless pairing information has been previously signed (during a prior scanning process between the target device 130 and the same host device 120 or different host device) with a user credential supplied to the same host device 120 or a different host device. In one embodiment, the target device 130 may transmit the electronic signature in a separate message in a standards-compliant or non-standards compliant manner before or after the transmission of the wireless pairing information.

The process of signing a target device 130 with a user credential assigned to a user 110 to generate a signature key is referred to as a signing process. In the embodiments described herein, "signing process" refers to a process by which the target device 130 obtains a signature key from its initial contact with a host device 120 based on user input selecting the target device 130 for signing the target device with a user credential supplied to the host device. The target device 130 stores the signature key obtained from the host device during the signing process. The signing process is further described below in the example shown in FIG. 4. The target device 130 generates an electronic signature as a function of the signature key received from the host device 120 during the signing process and a unique device identifier (e.g., Bluetooth device address) associated with the target device 130.

Once a target device 130 obtains and stores a signature key based on an initial contact with a host device 120 during the signing process, the target device 130 may automatically re-pair with any of the host devices 120 selected from the pool of host devices as long as the host device 120 is logged in using the same user credential as the one that was previously used to sign the target device 130. In other words, a host device 120 to which the target device 130 is attempting to re-pair using the electronic signature need not be the same host device 120 from which the target device 130 obtained the signature key during the signing process. For example, a target device 130-1 can obtain a signature key from a host device 120-1 when a user 110 initiates a signing process by selecting the target device 130-1 and signing the target device 130-1 with a user credential assigned to the user 110. In this example, the same target device 130-1 can successfully re-pair with another host device 120-2 as long as the host device 120-2 is logged into using the user credential assigned to the same user 110.

As described below with reference to blocks 340 and 350, when the wireless pairing information received from the target device 130 includes an electronic signature, the host device 120 performs a validation process to ensure that the electronic signature received from the target device 130 is associated with a user credential currently used to log into the host device 120 and further automatically initiates a pairing process (also referred to as re-pairing process) without any user input after validating the electronic signature. On the other hand, when the wireless pairing information received from the target device 130 does not include an electronic signature, the host device 120 may initiate a signing process with the target device 130 based on user input selecting the target device 130 for signing the target device 130 with the user credential. As a result of the signing process, the host device 120 generates a signature key and transmits the signature key to the target device 130 to enable the target device 130 to re-pair with any host device 120 logged into using the same user credential. Alternatively, the host device 120 may also perform a standards-compliant pairing process (i.e., without performing the signing process) in response to user input selecting the target device 130 for pairing with the host device 120

Returning to block 330, when the wireless pairing information received from the target device 130 includes an electronic signature, the host device 120 generates a runtime electronic signature as a function of the user credential received as an input for logging into the host device at block 310 and the unique device identifier included in the wireless pairing information. The electronic signature generated by the host device is referred to as "run-time electronic signature" because the electronic signature is generated based on information (i.e., user credential and unique device identifier of the target device) not previously (i.e., prior to the user 110 logging into the device) cached or stored at the host device. In accordance with embodiments, the host device 120/target device 130 may use any suitable cryptographic function to generate signature key/electronic signature/run-time electronic signature.

At block 340, the host device 120 compares the electronic signature received at block 330 with the run-time signature generated at the host device 120 after receiving the wireless pairing information. When the host device 120 determines that the electronic signature received at block 330 does not match with the run-time signature, the host device 120 refrains from initiating a pairing process with the target device 130. In other words, the electronic signature does not match with the run-time signature because the target device 130 was most likely signed off using a user credential assigned to a different user. In this event, the target device 130 can only re-pair with another host device (e.g., host device 120-2) that is currently logged into using a user credential that was used to sign the target device 130 during the signing process.

On the other hand, when the host device 120 determines that the electronic signature received at block 330 matches with the run-time signature, the host device 120 proceeds to block 350 to initiate a standards-compliant pairing process to establish a short-range communication link 220 with the target device 130. The host device 120 and target device 130 may exchange additional messages to complete the pairing process. Once the pairing process is complete, the host device 120 and target device 130 become paired via the same short-range communication link 220 over which the wireless pairing information including the electronic signature was transmitted during the scanning process. In an embodiment in which the short-range communication link 220 is based on Bluetooth, the pairing process may include a legacy pairing (Bluetooth v. 2.0 and earlier) or a Secure Simple Pairing process (Bluetooth v. 2.1 and later).

In one embodiment, the electronic signature included in the wireless pairing information is generated using only the signature key stored at the target device 130. In this embodiment, the unique device identifier is not input to the function used to generate the electronic signature. So, the host device 120 also generates the signature key during the signing process using the user credential but not the unique device identifier associated with the target device 130. Accordingly, in this embodiment, the host device 120 is programmed to validate the received electronic signature by comparing it with a run-time signature that is also generated as a function of the user credential received at the host device 120 but not the unique device identifier.

In accordance with some embodiments, the host device 120 performs the pairing process to complete an additional authentication process to ensure that the target device 130 is associated with an authorized user. In these embodiments, the host device 120 transmits, to the target device 130, an authentication challenge including a first hash value generated as a function of (i) run-time signature key generated at the host device 120 as a function of the user credential and the unique device identifier associated with the target device 130 and (ii) a randomly generated key/number. In response, the target device 130 may generate an authentication challenge response including a second hash value generated as a function of the first hash value and the signature key already stored at the target device 130. The target device 130 then transmits the authentication challenge response to the host device 120. The host device 120 compares the second hash value received from the target device 130 with a third hash value locally generated at the host device 120 as a function of the first hash value and the run-time signature key (i.e., run time signature key generated at block 340). The host device 120 then establishes the short-range communication link 220 between the host device 120 and the target device 130 when the second hash value matches with the third hash value. On the other hand, when the second hash value does not match with the third hash value, the host device 120 refrains from establishing the short-range communication link 220 between the host device and the target device.

In one embodiment, the host device 120 performs the additional authentication process after completing the pairing process between the host device 120 and the target device 130 using legacy pairing or Secure Simple Pairing process. In this embodiment, when the host device 120 and target device 130 are paired and connected, the host device 120 transmits an authentication challenge including a first hash value generated as a function of (i) run-time signature key generated at the host device 120 as a function the user credential and the unique device identifier associated with the target device 130 and (ii) a randomly generated key/number. In response, the target device 130 may generate an authentication challenge response including a second hash value generated as a function of the first hash value and the signature key already stored at the target device 130. The target device 130 then transmits the authentication challenge response to the host device 120. The host device 120 compares the second hash value received from the target device 130 with a third hash value locally generated at the host device 120 as a function of the first hash value and the run-time signature key (i.e., run time signature key generated at block 340). When the host device 120 determines that the second hash value matches with the third hash value, the host device 120 remains connected with the target device 130 via the short-range communication link 220 unless the host device 120 receives a user input indicating a request to be disconnected from the target device 130. On the other hand, when the host device 120 determines that the second hash value matches with the third hash value, the host device 120 initiates a standards-compliant process to terminate the short-range communication link 220 established between the host device 120 and the target device 130.

In accordance with some embodiments, as further described below with reference to FIG. 6, the user 110 may perform an un-signing process to un-sign a selected target device 130 with the user credential. During the un-signing process, a user may select a target device 130 and unlink the target device 130 from the user credential to ensure that the target device 130 is not automatically paired to any host device 120 that the user may be operating by logging into the host device 120 using the same user credential as the one that was used to sign the target device 130. When the host device 120 receives a user input selecting the target device 130 for un-signing the target device 130 with the user credential assigned to the user 110, the host device 120 responsively transmits a command to the target device 130 to request the target device 130 to not include the signature key (i.e., signature key previously obtained by the target device 130 in association with the user credential assigned to the same user 110) in future wireless pairing information messages transmitted or broadcasted from the target device 130 for pairing with a host device. In response to receiving this command from the host device 120, the target device 130 clears (i.e., deletes) the signature key information stored in a memory (e.g., storage 230) of the target device 130.

In accordance with embodiments, when the host device 120 is powered-off and/or when the host device is returned to the multi-unit charger or to a dedicated radio-shelf at the end of a work-shift, the host device 120 automatically clears all pairing information (e.g., wireless pairing information including the electronic signature and unique device identifier obtained from the target device, run-time signature locally generated at the host device 120, user credential supplied to the host device, hash values locally generated and/or received from the target device 130 etc.,) stored at a memory (e.g., storage 280) of the host device 120. Once the host device 120 is returned to the multi-unit charger 140, the host device 120 is available again to be selected by the same or a different user, for example, during a next work-shift. When the same (e.g., host device 120-1) or different host device (e.g., host device 120-2) is picked up again by the same user 110 during the next work-shift, the host device 120 executes the method 300 to automatically pair the host device 120 to the same target device 130 as long as the user credential used to log into the same or different host device 120 is same as the user credential used to sign the target device 130.

While in this example, the host device 120 is described as performing a method 300 to initiate a pairing process with only one of the target devices 130, in other embodiments, the host device may similarly perform the method 300 for two or more of the target devices 130 assigned to a user 110. For example, the host device 120 may perform the method 300 for two or more of the target devices 130 including the remote speaker microphone (RSM) 130-1, the video camera 130-2, the biometric sensor device 130-3, the smart glass 130-4, the earpiece 130-5, the activity tracker 130-6, or the weapon status detector 130-7.

Figure 4:
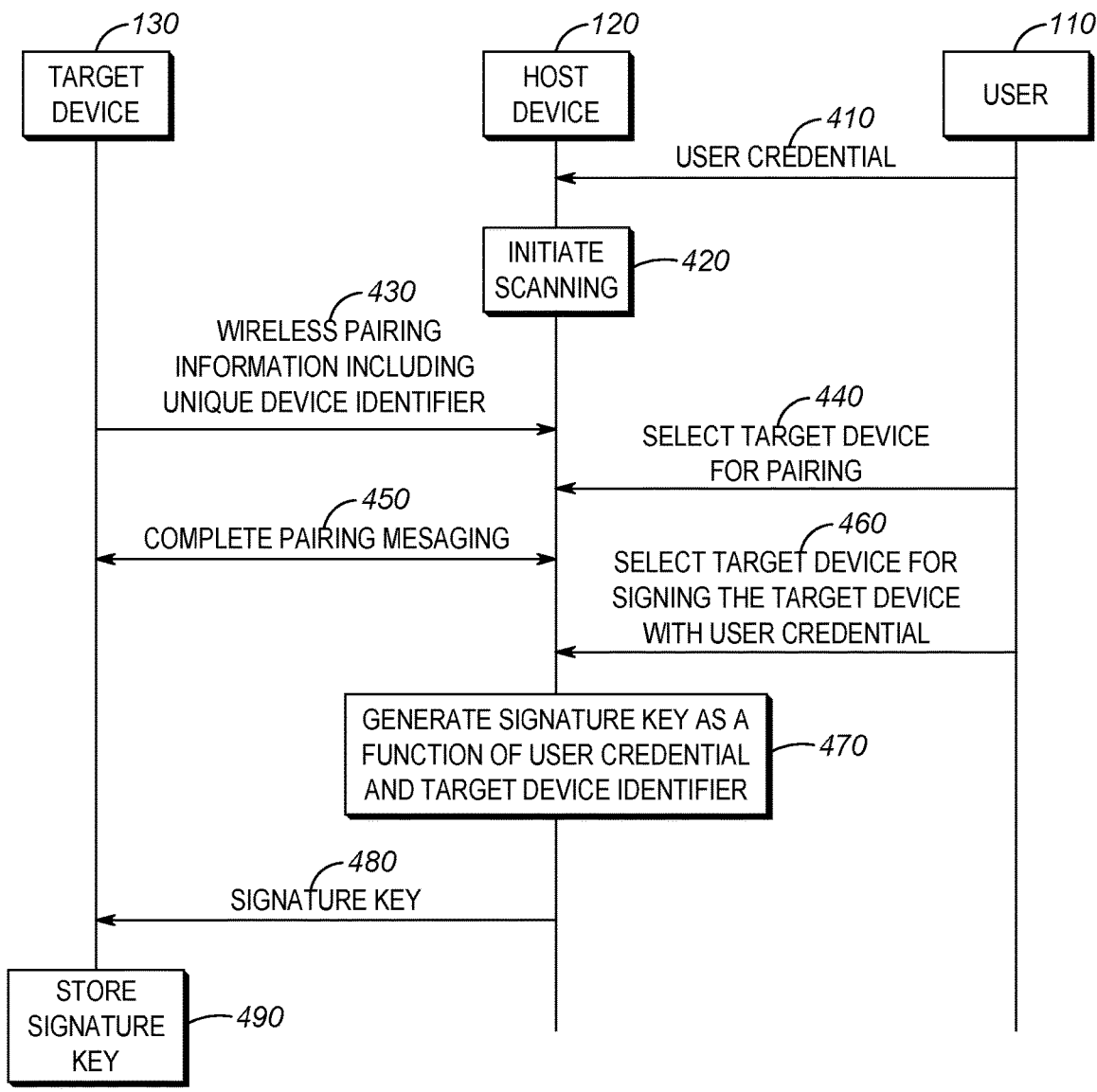
FIG. 4 illustrates a message sequence chart (MSC) showing transmissions, receptions, and process steps for signing a target device with a user credential supplied to a host device in accordance with some embodiments.

Referring now to FIG. 4, a message sequence chart (MSC) illustrates a signing process 400 for signing a target device with a user credential assigned to a user in accordance with some embodiments. The signing process 400 is illustrated as occurring between a host device 120, target device 130, and a user 110. While one target device is illustrated in FIG. 4 for illustration purposes, same or similar steps may be executed for two or more target devices, such as, but not limited to, the remote speaker microphone (RSM) 130-1, the video camera 130-2, the biometric sensor device 130-3, the smart glass 130-4, the earpiece 130-5, the activity tracker 130-6, and the weapon status detector 130-7.

The signing process 400 may begin with a user 110 selecting a host device 120 (e.g., host device 120-1) from a pool of host devices 120 placed, for example, in a multi-unit charger 140. After selecting the host device 120 for use in communicating during the user's 110 work-shift, the user 110 provides a user credential 410 (e.g., a password, a face identification, a touch identification etc.,) to log into the host device 120. In response to receiving the user credential, the host device 120 authorizes the use of the host device by the user 110 after verifying that the user credential is associated with an authorized user. The host device 120 automatically, or in response to an input from the user 110, initiates a scanning process 420 in which it searches for target devices 130 to connect with using a short-range receiver (e.g., Bluetooth radio 255) over a short-range communication link (e.g., Bluetooth link 220). During the scanning process, and perhaps in response to an inquiry message received from the host device 120 (when implementing the Bluetooth protocol) or perhaps on a periodic basis, the target device 130 transmits wireless pairing information 430 including a unique device identifier (e.g., Bluetooth device address) associated with the target device 130. In this example, since this is the first time a target device 130 is attempting to pair with a host device, the target device 130 has not been previously signed with a user credential, and therefore the target device 130 does not already possess a signature key signed using a user credential. Accordingly, in this example, the target device 130 does not yet advertise any material (i.e., electronic signatures) signed with a user credential in the wireless pairing information.

In response to receiving the wireless pairing information 430 from the target device 130, the host device 120 may provide an electronic output (e.g., via a display or an audio output) indicating the availability of the target device 130 for pairing with the host device 120. In response, the user 110 may interact with the user interface 275 to select 440 the target device 130 for pairing. It is possible that the host device 120 has received wireless pairing information from multiple target devices that are in the scanning range of the host device 120. In such a case, the host device 120 may provide an electronic output, for example, via a display showing a list of target devices 130 available for pairing. In response, the user 110 may select, via navigation buttons of the user interface 275, a particular one or more target devices (e.g., RSM 130-1) from the list of target devices available for pairing. In another embodiment, the selection may have been detected via a microphone input and recognition of a selection via voice command. Other possibilities exist as well.

In any event, when a target device 130 (e.g., RSM 130-1) is selected by the user 110 for pairing, the host device 120 initiates a standards-compliant pairing process to complete the pairing between the host device and the selected target device 130 to establish a short-range communication link 220 with the target device 130. The host device 120 and target device 130 may exchange additional messages 450 to complete the pairing process. Once the pairing process is complete, the host device 120 and target device 130 become paired via the same short-range communication link 220 over which the wireless pairing information 430 was transmitted. In an embodiment in which the short-range communication link 220 is based on Bluetooth, the pairing process may include a legacy pairing (Bluetooth v. 2.0 and earlier) or a Secure Simple Pairing process (Bluetooth v. 2.1 and later).

Additionally, the user 110 may also initiate a signing operation to sign the target device with the user's 110 user credential because once a target device 130 assigned to the user is signed with the user's 110 user credential, the target devices 130 assigned to the user can be automatically paired without further user input to any host device 120 selected by the user from the pool of target devices available to the user 110. For instance, if the user 110 knows that the target device 130 will remain with the user 110 for multiple work-shifts, the user 110 can decide to sign the target device 130 to link the target device 130 with his/her user credential so that the target device 130 will be automatically re-paired with any host device 120 operated by the user 110 as long as the host device 120 is logged in using the same user credential. In the example shown in FIG. 4, the user 110 selects 460 the target device 130 (e.g., RSM 130-1) to sign the target device 130 with the user credential assigned to the user 110. In one embodiment, the user 110 launches a secure signing application installed in the host device 120 to invoke the signing operation. The user 110 may then select, via navigation buttons of the user interface 275, one or more target devices 130 from a list of target devices 130 that are available for signing with the user credential. In another embodiment, the selection may have been detected via a microphone input and recognition of a selection via voice command. Other possibilities exist as well. In any event, in response to detecting the input identifying the selection of the one or more target devices 130 for signing, the host device 120 may automatically sign the selected target device 130 using the user credential used by the user 110 to initially log into the host device 120. In some embodiments, the host device 120 may re-prompt the user to provide a user credential that will be used for signing the selected target device 1230. The host device 120 then "signs" the target device 130 with the user credential by generating 470 a signature key (for each target device 130 to be signed) as a function of the user credential supplied to the host device 120 for signing the target device 130 and the unique device identifier included in the wireless pairing information 430. The host device 120 may use suitable cryptographic function to sign the target device 130 with the user credential and generate a signature key. The host device 120 then transmits a message 480 including the signature key via the short-range communication link 220 established with the target device 130. In one embodiment, the message 480 may also include instructions to the target device to include an electronic signature (i.e., electronic signature generated as a function of the signature key) in future wireless pairing information transmitted/broadcasted from the target device 130 for pairing purposes. In response to receiving this message 480, the target device 130 stores 490 the signature key in its storage 230 and further uses the signature key for re-pairing (see FIG. 5) with any host device 120 signed using the user credential 410 that was used to sign the target device 130.

Figure 5:
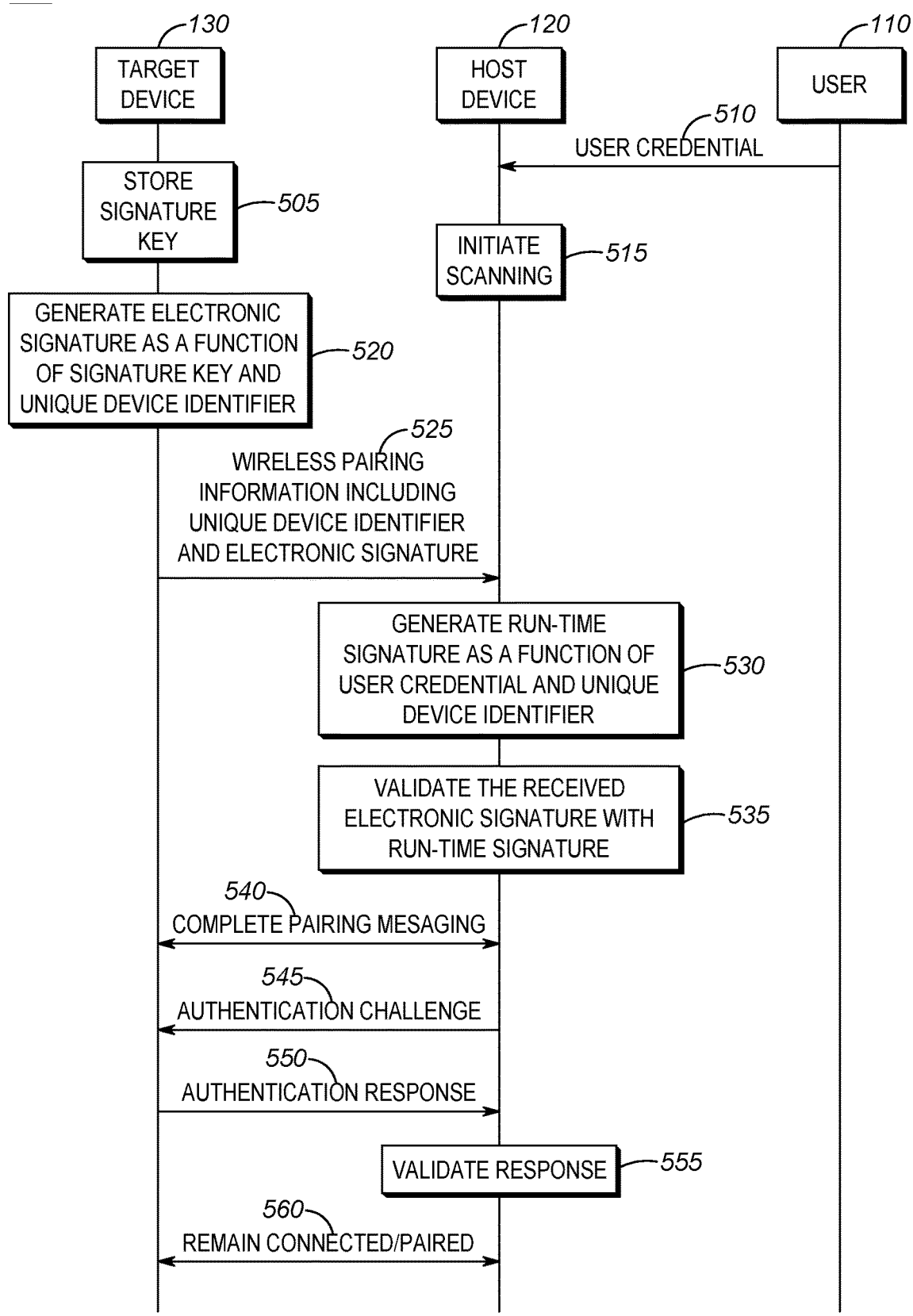
FIG. 5 illustrates a message sequence chart (MSC) showing transmissions, receptions, and process steps for securely pairing a host device and a target device in accordance with some embodiments.

Referring now to FIG. 5, a message sequence chart (MSC) illustrates a pairing process 500 between a host device and a target device already signed with a user credential. The pairing process 500 is illustrated as occurring between a host device 120, target device 130, and a user 110. While one target device is illustrated in FIG. 5 for illustration purposes, same or similar steps may be executed for two or more target devices, such as, but not limited to, the remote speaker microphone (RSM) 130-1, the video camera 130-2, the biometric sensor device 130-3, the smart glass 130-4, the earpiece 130-5, the activity tracker 130-6, and the weapon status detector 130-7.

The target device 130 shown in FIG. 5 represents a target device which has been previously signed by the user 110 with the user credential 410 during the signing process 400 as shown in FIG. 4. The target device 130 shown in FIG. 5 has accordingly obtained a signature key signed with the user credential 410 assigned to the user 110 and further has stored the signature key 505 in its local memory (e.g., storage 230).

The secure pairing process 500 may begin with a user 110 selecting a host device 120 (e.g., host device 120-1) from a pool of host devices placed, for example, in a multi-unit charger 140. The selected host device 120 shown in FIG. 5 may be the same host device 120 used by the user 110 to complete the signing process 400 shown in FIG. 4. Alternatively, the host device 120 shown in FIG. 5 may be a different host device than the one used by the user 110 to complete the signing process 400 shown in FIG. 5. Regardless of the host device 120 selected by the user 110, the pairing process 500 can be executed to automatically pair the selected device 120 to the host device 130 as long as the target device 130 possesses a signature key that was signed using the same user credential as the one being used to log into the host device 120 currently selected by the user 110.

After selecting the host device 120 for use in communicating during the work-shift, the user 110 provides a user credential 510 (e.g., a password, a face ID etc.,) log into the host device 120. In response to receiving the user credential 510, the host device 120 authorizes the use of the host device 120 by the user 110 after verifying that the user credential 510 is associated with an authorized user. As shown in FIG. 5, the process 500 requires no user input other than the user credential 510 used to log into the selected host device 120 for automatically pairing the host device 120 with one or more target devices 130 previously (i.e., during the signing process 400 shown in FIG. 4) signed by the user 110.

The host device 120 automatically, or in response to an input from the user, initiates a scanning process 515 in which it searches for target devices 130 to connect with using a short-range receiver (e.g., Bluetooth radio 255) over a short-range communication link (e.g., Bluetooth link 220). During the scanning process, and perhaps in response to an inquiry message received from the host device 120 (when implementing the Bluetooth protocol) or perhaps on a periodic basis, the target device 130 generates 520 an electronic signature as a function of (i) the signature key 505 already stored at the target device 130 and (ii) a unique device identifier (e.g., Bluetooth device address) associated with the target device 130. The target device 130 may use any suitable cryptographic function to generate the electronic signature. The target device 130 further transmits the wireless pairing information 525 including the unique device identifier and the electronic signature.

When the host device 120 determines that the wireless pairing information 525 received from the target device 130 includes an electronic signature, the host device 120 generates 530 a run-time electronic signature as a function of the user credential 510 received as an input for logging into the host device and the unique device identifier included in the wireless pairing information. The host device 120 then validates 535 the received electronic signature with the run-time signature. In the example shown in FIG. 5, since the electronic signature received from the target device 130 and the run-time electronic signature generated by the host device 120 are both respectively signed using the same user credentials 410, 510, the electronic signatures will match and therefore the received electronic signature is successfully validated 535. Once the received electronic signature is validated 535, the host device 120 automatically initiates a standards-compliant pairing process to establish a short-range communication link 220 with the target device 130. The host device 120 and target device 130 may exchange additional messages 540 to complete the pairing process. Once the pairing process is complete, the host device and target device 130 become paired via the same short-range communication link 220 over which the wireless pairing information including the electronic signature was transmitted.

In the example shown in FIG. 5, when the host device 120 and target device 130 are paired and connected, the host device 120 transmits an authentication challenge 545 including a first hash value generated as a function (i) run-time signature key generated at the host device 120 as a function the user credential and the unique device identifier associated with the target device and (ii) a randomly generated key/number. In response, the target device 130 may generate an authentication challenge response 550 including a second hash value generated as a function of the first hash value and the signature key already stored at the target device 130. The target device 130 then transmits the authentication challenge response 550 to the host device 120. The host device 120 then validates 555 the authentication challenge response by comparing the second hash value received from the target device 130 with a third hash value generated locally generated at the host device 120 as a function of the first hash value and the run-time signature key. When the host device 120 determines that the second hash value matches with the third hash value, the authentication challenge response is successfully validated 555, and the host device remains 560 paired/connected with the target device 130 via the short-range communication link 220.

Figure 6:
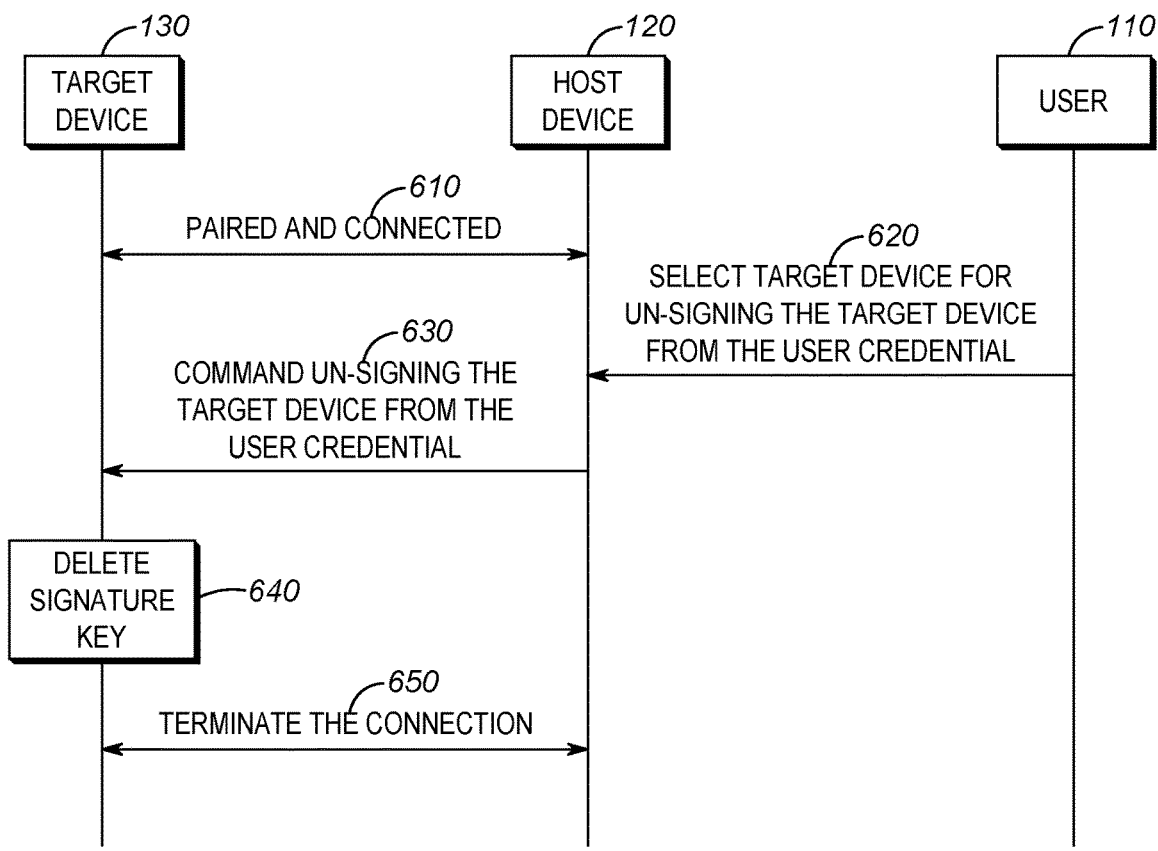
FIG. 6 illustrates a message sequence chart (MSC) showing transmissions, receptions, and process steps for un-signing a target device in accordance with some embodiments.

Referring now to FIG. 6, a message sequence chart (MSC) illustrates an un-signing process 600 between a host device and a target device already signed with a user credential. The un-signing process 600 is illustrated as occurring between a host device 120, target device 130, and a user 110. While one target device is illustrated in FIG. 6 for illustration purposes, same or similar steps may be executed for two or more target devices, such as, but not limited to, the remote speaker microphone (RSM) 130-1, the video camera 130-2, the biometric sensor device 130-3, the smart glass 130-4, the earpiece 130-5, the activity tracker 130-6, and the weapon status detector 130-7.

In the example shown in FIG. 6, the host device 120 and the target device 130 are already paired and connected 610 to each other by performing the pairing process 500 shown in FIG. 5. The un-signing process 600 may begin with the user selecting 620 the target device for un-signing the target device 130 with the user's 110 user credential 510. The user 110 may also select more than one target device to initiate the un-signing process. In one embodiment, the host device 120 may prompt the user 110 to reenter the user credential 510 in response to the user selecting the target device 130 for initiating the un-signing process 600. The host device 120 then transmits a command 630 to the target device 130 to instruct the target device 130 to un-sign the target device 130 from the user credential 510. The command 630 may also include an instruction to the target device 130 to not include the signature key in future wireless pairing information messages transmitted or broadcasted from the target device 130 for pairing with a host device 120. In response to receiving this command 630 from the host device 120, the target device 130 deletes 640 the signature key information stored at a memory (e.g., storage 230) of the target device 130. When the un-signing process 600 is completed with the target device 130 deleting 640 the signature key, the host device 120 and/or target device 130 may terminate 650 the short-range communication link 220 established between the host device 120 and the target device 130.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of securely pairing devices, the method comprising:
   receiving, at a host device, an input indicating a user credential for logging into the host device;
   initiating, at the host device, a scanning process for discovering target devices available for pairing with the host device;
   receiving, at the host device, during the scanning process, wireless pairing information from a target device of the target devices, the wireless pairing information including (i) a unique device identifier associated with the target device and (ii) an electronic signature generated as a function of a signature key stored at the target device and the unique device identifier associated with the target device;
   comparing, at the host device, the electronic signature with a run-time signature generated at the host device as a function of the user credential received at the host device and the unique device identifier included in the wireless pairing information; and
   initiating, at the host device, a pairing process to establish a short-range communication link with the target device when the electronic signature matches with the run-time signature,
   wherein the signature key stored at the target device corresponds to a key generated at the host device as a function of (i) a user credential supplied to the host device during a signing process between the host device and the target device and (ii) the unique device identifier associated with the target device.

2. The method of claim 1, wherein the signature key stored at the target device corresponds to a key generated at a second host device different from the host device as a function of (i) a user credential supplied to the second host device during a signing process between the second host device and the target device and (ii) the unique device identifier associated with the target device.

3. The method of claim 1, further comprising:
   receiving, at the host device, during a signing process between the host device and the target device, a user input selecting the target device for signing the target device with the user credential;
   generating, at the host device, during the signing process, the signature key as a function of (i) the user credential supplied to the host device for signing the target device and (ii) the unique device identifier associated with the target device; and
   transmitting, at the host device, during the signing process, the signature key to the target device.

4. The method of claim 1, further comprising:
   receiving, at the host device, a user input selecting the target device for un-signing the target device with the user credential; and
   responsively transmitting, at the host device, a command to the target device to clear the signature key stored at the target device.

5. The method of claim 1, further comprising:
   refraining from initiating the pairing process with the target device when the electronic signature does not match the run-time signature.

6. The method of claim 1, wherein initiating the pairing process comprises:
   using a legacy pairing or a Secure Simple Pairing process to pair the host device and target device.

7. The method of claim 1, further comprising:
transmitting, to the target device, an authentication challenge including a first hash value generated as a function of (i) a run-time signature key generated at the host device as a function of the user credential and the unique device identifier associated with the target device and (ii) a randomly generated key;
receiving, from the target device, an authentication challenge response including a second hash value generated as a function of the first hash value and the signature key stored at the target device;
comparing the second hash value with a third hash value generated as a function of the first hash value and the run-time signature key; and
maintaining the short-range communication link between the host device and the target device when the second hash value matches with the third hash value.

8. The method of claim 1, further comprising:
receiving, at the host device, during the scanning process, wireless pairing information from at least one other target device of the target devices including (i) a second unique device identifier associated with the at least one other target device and (ii) a second electronic signature generated as a function of a second signature key stored at the at least one other target device, wherein the second signature key corresponds to a key generated at the host device as a function of (i) a user credential supplied to the host device during a second signing process between the host device and the at least one other target device and (ii) the second unique device identifier associated with the at least one other target device;
comparing the second electronic signature with a second run-time signature generated at the host device as a function of the user credential supplied to the host device during the second signing process and the second unique device identifier; and
initiating, at the host device, a pairing process to establish a short-range communication link with the at least one other target device when the second electronic signature matches with the second run-time signature.

9. The method of claim 1, further comprising:
receiving an input indicating that a user associated with the user credential is logging out from the host device, and responsively clearing, from a storage of the host device, (i) wireless pairing information received from the target device and (ii) the run-time signature.

10. A host device, comprising:
a short-range wireless radio; and
an electronic processor communicatively coupled to the short-range wireless radio, wherein the electronic processor is configured to:
receive an input indicating a user credential for logging into the host device;
initiate, via the short-range wireless radio, a scanning process for discovering target devices available for pairing with the host device;
receive, via the short-range wireless radio, during the scanning process, wireless pairing information from a target device of the target devices, the wireless pairing information including (i) a unique device identifier associated with the target device and (ii) an electronic signature generated as a function of a signature key stored at the target device and the unique device identifier associated with the target device;
compare the electronic signature with a run-time signature generated at the host device as a function of the user credential received at the host device and the unique device identifier included in the wireless pairing information; and
initiating, via the short-range wireless radio, a pairing process to establish a short-range communication link with the target device when the electronic signature matches with the run-time signature,
wherein the signature key stored at the target device corresponds to a key generated at the host device as a function of (i) a user credential supplied to the host device during a signing process between the host device and the target device and (ii) the unique device identifier associated with the target device.

11. The host device of claim 10, wherein the signature key stored at the target device corresponds to a key generated at a second host device different from the host device as a function of (i) a user credential supplied to the second host device during a signing process between the second host device and the target device and (ii) the unique device identifier associated with the target device.

12. The host device of claim 10, wherein the electronic processor is configured to:
receive, during a signing process between the host device and the target device, a user input selecting the target device for signing the target device with the user credential;
generate, during the signing process, the signature key as a function of (i) the user credential supplied to the host device for signing the target device and (ii) the unique device identifier associated with the target device; and
transmit, via the short-range wireless radio, during the signing process, the signature key to the target device.

13. The host device of claim 10, wherein the electronic processor is configured to:
receiving, at the host device, a user input selecting the target device for un-signing the target device from the user credential; and
responsively transmitting, at the host device, a command to the target device to clear the signature key stored at the target device.

14. The host device of claim 10, wherein the electronic processor is configured to use a legacy pairing or a Secure Simple Pairing process to pair the host device and target device.

15. The host device of claim 10, wherein the electronic processor is configured to:
transmit, via the short-range wireless radio, to the target device, an authentication challenge including a first hash value generated as a function of (i) a run-time signature key generated at the host device as a function of the user credential and the unique device identifier associated with the target device and (ii) a randomly generated key;
receive, via the short-range wireless radio, from the target device, an authentication challenge response including a second hash value generated as a function of the first hash value and the signature key stored at the target device;
compare the second hash value with a third hash value generated as a function of the first hash value and the run-time signature key; and
maintain the short-range communication link between the host device and the target device when the second hash value matches with the third hash value.

16. The host device of claim 10, further comprising:
a storage for storing the wireless pairing information received from the target device and the run-time signature, wherein the electronic processor is configured to receive an input indicating that a user associated with the user credential is logging out from the host device, and responsively clear, from the storage of the host device, (i) wireless pairing information received from the target device and (ii) the run-time signature.

17. A method of securely pairing devices, the method comprising:

receiving, at a host device, an input indicating a user credential for logging into the host device;

initiating, at the host device, a scanning process for discovering target devices available for pairing with the host device;

receiving, at the host device, during the scanning process, wireless pairing information from a target device of the target devices, the wireless pairing information including an electronic signature generated as a function of a signature key stored at the target device;

comparing, at the host device, the electronic signature with a run-time signature generated at the host device as a function of the user credential received at the host device; and initiating, at the host device, a pairing process to establish a short-range communication link with the target device when the electronic signature matches with the run-time signature, wherein the signature key stored at the target device corresponds to a key generated at the host device as a function of a user credential supplied to the host device during a signing process between the host device and the target device.

* * * * *